US010993264B1

(12) United States Patent
Yang et al.

(10) Patent No.: US 10,993,264 B1
(45) Date of Patent: Apr. 27, 2021

(54) MULTIPLEXING CHANNEL STATE INFORMATION REPORTS IN MULTIPLE TRANSMIT-RECEIVE POINT (TRP) SCENARIOS

(71) Applicant: QUALCOMM Incorporated, San Diego, CA (US)

(72) Inventors: Wei Yang, San Diego, CA (US); Mostafa Khoshnevisan, San Diego, CA (US); Yi Huang, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/947,858

(22) Filed: Aug. 20, 2020

Related U.S. Application Data

(60) Provisional application No. 62/915,566, filed on Oct. 15, 2019.

(51) Int. Cl.
*H04W 74/08* (2009.01)
*H04L 5/00* (2006.01)
(Continued)

(52) U.S. Cl.
CPC ....... *H04W 74/0816* (2013.01); *H04L 5/0053* (2013.01); *H04W 72/0446* (2013.01)

(58) Field of Classification Search
CPC ......... H04W 74/0875; H04W 74/0841; H04W 74/085; H04W 74/0816; H04W 72/0446
See application file for complete search history.

(56) References Cited

U.S. PATENT DOCUMENTS

2013/0114455 A1  5/2013  Yoo et al.
2013/0250924 A1*  9/2013  Chen .................... H04L 1/1819
                                                           370/336
(Continued)

OTHER PUBLICATIONS

Huawei, et al., "Enhancements on Multi-TRP/panel Transmission", 3GPP Draft, 3GPP TSG RAN WG1 Meeting #95, R1-1812243, 3rd Generation Partnership Project (3GPP), Mobile Competence Centre, 650, Route Des Lucioles, F-06921, Sophia-Antipolis Cedex, France, vol. RAN WG1, No. Spokane, USA; 20181112-20181116, Nov. 11, 2018 (Nov. 11, 2018), XP051554125, 9 pages, Retrieved from the Internet: URL: http://www.3gpp.org/ftp/Meetings% 5F3GPP% 5FSYNC/RAN1/Docs/R1%2D1812243%2Ezip [retrieved on Nov. 11, 2018].

(Continued)

*Primary Examiner* — Faruk Hamza
*Assistant Examiner* — Abusayeed M Haque
(74) *Attorney, Agent, or Firm* — Harrity & Harrity, LLP \ Qualcomm

(57) ABSTRACT

This disclosure provides systems, methods, apparatuses, and computer-readable media for multiplexing channel state information (CSI) reports in scenarios involving multiple transmit-receive points (TRPs). In one aspect, a user equipment (UE) may receive at least one configuration that identifies a resource for multiplexing CSI reports that have a potential to collide in a slot. The UE may receive the at least one configuration from either, or both, of a first TRP or a second TRP. The UE may transmit at least one of a first set of CSI reports to the first TRP or a second set of CSI reports to the second TRP, multiplexed in the resource, according to the at least one configuration.

30 Claims, 8 Drawing Sheets

(51) Int. Cl.
*H04W 74/02* (2009.01)
*H04W 72/04* (2009.01)

(56) References Cited

U.S. PATENT DOCUMENTS

| | | | |
|---|---|---|---|
| 2018/0062724 A1* | 3/2018 | Onggosanusi | H04B 7/0413 |
| 2018/0278392 A1* | 9/2018 | Onggosanusi | H04L 5/005 |
| 2019/0182697 A1* | 6/2019 | Zhang | H04B 7/088 |
| 2019/0222286 A1* | 7/2019 | Miao | H04B 7/066 |
| 2019/0261361 A1 | 8/2019 | Xiong et al. | |
| 2019/0273544 A1* | 9/2019 | Cha | H04L 1/0026 |
| 2019/0356448 A1* | 11/2019 | Li | H04L 27/2607 |
| 2020/0007200 A1* | 1/2020 | Schreck | H04B 7/0417 |
| 2020/0044712 A1* | 2/2020 | Manolakos | H04L 5/0044 |
| 2020/0067661 A1* | 2/2020 | Siomina | H04W 4/06 |
| 2020/0228282 A1* | 7/2020 | Kwak | H04L 1/00 |
| 2020/0351892 A1* | 11/2020 | Yi | H04L 5/0092 |

OTHER PUBLICATIONS

Intel Corporation: "On Multi-TRP/multi-panel Transmission," 3GPP Draft, 3GPP TSG RAN WG1 Meeting #96bis, R1-1904313, MULTITRP, 3rd Generation Partnership Project (3GPP), Mobile Competence Centre, 650, Route Des Lucioles, F-06921, Sophia-Antipolis Cedex, France, vol. RAN WG1, No. Xi 'an, China, 20190408-20190412, Apr. 7, 2019 (Apr. 7, 2019), XP051699615, pp. 1-17, Retrieved from the Internet: URL: http://www.3gpp.org/ftp/Meetings%5F3GPP%5FSYNC/RAN1/Docs/R1%2D1904313%2Ezip [retrieved on Apr. 7, 2019] section 3.
International Search Report and Written Opinion—PCT/US2020/070540—ISA/EPO—dated Nov. 17, 2020.
OPPO: "Enhancements on Multi-TRP and Multi-panel Transmission", 3GPP Draft, 3GPP TSG RAN WG1 Meeting #98bis, R1-1910116, 3rd Generation Partnership Project (3GPP), Mobile Competence Centre, 650, Route Des Lucioles, F-06921, Sophia-Antipolis Cedex, France, vol. RAN WG1, No. Chongqing, China; 20191014-20191020, Oct. 4, 2019 (Oct. 4, 2019), XP051808070, 13 pages, Retrieved from the Internet: URL: https://ftp.3gpp.org/tsg_ran/WG1_RL1/TSGR1_98b/Docs/R1-1910116.zip R1-1910116.doc [retrieved on Oct. 4, 2019] p. 6-p. 7.

* cited by examiner

MULTIPLEXING CHANNEL STATE INFORMATION REPORTS IN MULTIPLE TRANSMIT-RECEIVE POINT (TRP) SCENARIOS

CROSS-REFERENCE TO RELATED APPLICATION

This Patent Application claims priority to U.S. Provisional Patent Application No. 62/915,566, filed on Oct. 15, 2019, entitled "MULTIPLEXING CHANNEL STATE INFORMATION REPORTS IN MULTIPLE TRANSMIT-RECEIVE POINT (TRP) SCENARIOS," and assigned to the assignee hereof. The disclosure of the prior Application is considered part of and is incorporated by reference into this Patent Application.

TECHNICAL FIELD

Aspects of the present disclosure relate generally to wireless communication, and to techniques for multiplexing channel state information reports in multiple transmit-receive point (TRP) scenarios.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB, among other examples.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include receiving at least one configuration that identifies a resource for multiplexing channel state information (CSI) reports with a potential to collide in a slot; determining that multiple CSI reports of a first set of CSI reports that are to be transmitted to a first transmit-receive point (TRP), or a second set of CSI reports that are to be transmitted to a second TRP, have the potential to collide in the slot; and transmitting at least one of the first set of CSI reports to the first TRP or the second set of CSI reports to the second TRP according to the at least one configuration, where the first set of CSI reports or the second set of CSI reports are multiplexed in the resource.

In some implementations, the at least one configuration identifies a plurality of resources, and the method may further include selecting the resource for multiplexing CSI reports based on a payload size of the first set of CSI reports or the second set of CSI reports.

In some implementations, determining that multiple CSI reports have the potential to collide in the slot includes determining that a first CSI report and a second CSI report are scheduled in overlapping resources in the slot.

In some implementations, the method may further include determining a first association between the first set of CSI reports and the first TRP and a second association between the second set of CSI reports and the second TRP.

In some implementations, the first association and the second association are determined based on at least one of: a first other configuration identifying a first resource for transmitting CSI reports as being associated with the first TRP and a second other configuration identifying a second resource for transmitting CSI reports as being associated with the second TRP; or another configuration that identifies a first CSI reporting configuration as being associated with the first TRP and a second CSI reporting configuration as being associated with the second TRP.

In some implementations, the method may further include identifying, prior to transmitting the at least one of the first set of CSI reports or the second set of CSI reports, a non-ideal backhaul condition between the first TRP and the second TRP.

In some implementations, the non-ideal backhaul condition is identified based on at least one of: another configuration that indicates the non-ideal backhaul condition, another configuration that identifies different hybrid automatic repeat request (HARQ) acknowledgment reports for the first TRP and the second TRP; a first other configuration identifying a first resource for transmitting CSI reports as being associated with the first TRP and a second other configuration identifying a second resource for transmitting CSI reports as being associated with the second TRP; or another configuration that identifies a first CSI reporting configuration as being associated with the first TRP and a second CSI reporting configuration as being associated with the second TRP.

In some implementations, the first set of CSI reports and the second set of CSI reports are transmitted in separate resources.

In some implementations, the second set of CSI reports is a subset of non-colliding CSI reports of a set of CSI reports having a plurality of CSI reports that have the potential to collide in the slot.

In some implementations, the second set of CSI reports includes one or more CSI reports that are selected according to one or more prioritization criteria from a set of CSI reports having a plurality of CSI reports that have the potential to collide in the slot.

In some implementations, the separate resources do not overlap.

In some implementations, receiving the at least one configuration includes receiving a first configuration that identifies a first resource for multiplexing CSI reports, and receiving a second configuration that identifies a second resource for multiplexing CSI reports, and the first set of CSI reports are transmitted, multiplexed in the first resource, to the first TRP, and the second set of CSI reports are transmitted, multiplexed in the second resource, to the second TRP.

In some implementations, the second configuration further identifies a third resource for multiplexing CSI reports, and the method may further include selecting the second resource for transmitting the second set of CSI reports based on a determination that the third resource overlaps with the first resource in the slot, and the second resource does not overlap with the first resource in the slot.

In some implementations, the at least one configuration is a single configuration that identifies a first resource for multiplexing CSI reports that are to be transmitted to the first TRP and a second resource for multiplexing CSI reports that are to be transmitted to the second TRP, and the first set of CSI reports are transmitted, multiplexed in the first resource, to the first TRP, and the second set of CSI reports are transmitted, multiplexed in the second resource, to the second TRP.

Another innovative aspect of the subject matter described in this disclosure can be implemented in an apparatus of a UE for wireless communication. The apparatus may include a first interface configured to obtain at least one configuration that identifies a resource for multiplexing CSI reports with a potential to collide in a slot. The apparatus may include a processing system configured to determine that multiple CSI reports of a first set of CSI reports that are to be transmitted to a first TRP, or a second set of CSI reports that are to be transmitted to a second TRP, have the potential to collide in the slot. The apparatus may include a second interface configured to output at least one of the first set of CSI reports to the first TRP or the second set of CSI reports to the second TRP according to the at least one configuration, where the first set of CSI reports or the second set of CSI reports are multiplexed in the resource.

In some implementations, the at least one configuration identifies a plurality of resources, and the processing system is further configured to select the resource for multiplexing CSI reports based on a payload size of the first set of CSI reports or the second set of CSI reports.

In some implementations, the processing system, when determining that multiple CSI reports have the potential to collide in the slot, is configured to determine that a first CSI report and a second CSI report are scheduled in overlapping resources in the slot.

In some implementations, the processing system is further configured to determine a first association between the first set of CSI reports and the first TRP and a second association between the second set of CSI reports and the second TRP.

In some implementations, the first association and the second association are determined based on at least one of: a first other configuration identifying a first resource for transmitting CSI reports as being associated with the first TRP and a second other configuration identifying a second resource for transmitting CSI reports as being associated with the second TRP; or another configuration that identifies a first CSI reporting configuration as being associated with the first TRP and a second CSI reporting configuration as being associated with the second TRP.

In some implementations, the processing system is further configured to identify, prior to outputting the at least one of the first set of CSI reports or the second set of CSI reports, a non-ideal backhaul condition between the first TRP and the second TRP.

In some implementations, the non-ideal backhaul condition is identified based on at least one of: another configuration that indicates the non-ideal backhaul condition; another configuration that identifies different HARQ acknowledgment reports for the first TRP and the second TRP; a first other configuration identifying a first resource for transmitting CSI reports as being associated with the first TRP and a second other configuration identifying a second resource for transmitting CSI reports as being associated with the second TRP; or another configuration that identifies a first CSI reporting configuration as being associated with the first TRP and a second CSI reporting configuration as being associated with the second TRP.

In some implementations, the first set of CSI reports and the second set of CSI reports are outputted in separate resources.

In some implementations, the second set of CSI reports is a subset of non-colliding CSI reports of a set of CSI reports having a plurality of CSI reports that have the potential to collide in the slot.

In some implementations, the second set of CSI reports includes one or more CSI reports that are selected according to one or more prioritization criteria from a set of CSI reports having a plurality of CSI reports that have the potential to collide in the slot.

In some implementations, the separate resources do not overlap.

In some implementations, the processing system, when obtaining the at least one configuration, is configured to obtain a first configuration that identifies a first resource for multiplexing CSI reports, and obtain a second configuration that identifies a second resource for multiplexing CSI reports, and the first set of CSI reports are outputted, multiplexed in the first resource, for the first TRP, and the second set of CSI reports are outputted, multiplexed in the second resource, for the second TRP.

In some implementations, the second configuration further identifies a third resource for multiplexing CSI reports, and the processing system is further configured to select the second resource for transmitting the second set of CSI reports based on a determination that the third resource overlaps with the first resource in the slot, and the second resource does not overlap with the first resource in the slot.

In some implementations, the at least one configuration is a single configuration that identifies a first resource for multiplexing CSI reports that are to be transmitted to the first TRP and a second resource for multiplexing CSI reports that are to be transmitted to the second TRP, and the first set of CSI reports are outputted, multiplexed in the first resource, for the first TRP, and the second set of CSI reports are outputted, multiplexed in the second resource, for the second TRP.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive at least one configuration that identifies a resource for multiplexing CSI reports with a potential to collide in a slot; determine that multiple CSI reports of a first set of CSI reports that are to be transmitted to a first TRP, or a second set of CSI reports that are to be transmitted to a second TRP, have the potential to collide in the slot; and transmit at least one of the first set of CSI reports to the first TRP or the second set of CSI reports to the second TRP according to the at least one configuration, where the first set of CSI reports or the second set of CSI reports are multiplexed in the resource.

In some implementations, the at least one configuration identifies a plurality of resources, and the one or more instructions further cause the UE to select the resource for multiplexing CSI reports based on a payload size of the first set of CSI reports or the second set of CSI reports.

In some implementations, the one or more instructions, that cause the UE to determine that multiple CSI reports have the potential to collide in the slot, cause the UE to determine that a first CSI report and a second CSI report are scheduled in overlapping resources in the slot.

In some implementations, the one or more instructions further cause the UE to determine a first association between the first set of CSI reports and the first TRP and a second association between the second set of CSI reports and the second TRP.

In some implementations, the first association and the second association are determined based on at least one of: a first other configuration identifying a first resource for transmitting CSI reports as being associated with the first TRP and a second other configuration identifying a second resource for transmitting CSI reports as being associated with the second TRP; or another configuration that identifies a first CSI reporting configuration as being associated with the first TRP and a second CSI reporting configuration as being associated with the second TRP.

In some implementations, the one or more instructions further cause the UE to identify, prior to transmitting the at least one of the first set of CSI reports or the second set of CSI reports, a non-ideal backhaul condition between the first TRP and the second TRP.

In some implementations, the non-ideal backhaul condition is identified based on at least one of: another configuration that indicates the non-ideal backhaul condition; another configuration that identifies different HARQ acknowledgment reports for the first TRP and the second TRP; a first other configuration identifying a first resource for transmitting CSI reports as being associated with the first TRP and a second other configuration identifying a second resource for transmitting CSI reports as being associated with the second TRP; or another configuration that identifies a first CSI reporting configuration as being associated with the first TRP and a second CSI reporting configuration as being associated with the second TRP.

In some implementations, the first set of CSI reports and the second set of CSI reports are transmitted in separate resources.

In some implementations, the second set of CSI reports is a subset of non-colliding CSI reports of a set of CSI reports having a plurality of CSI reports that have the potential to collide in the slot.

In some implementations, the second set of CSI reports includes one or more CSI reports that are selected according to one or more prioritization criteria from a set of CSI reports having a plurality of CSI reports that have the potential to collide in the slot.

In some implementations, the separate resources do not overlap.

In some implementations, the one or more instructions, that cause the UE to receive the at least one configuration, cause the UE to receive a first configuration that identifies a first resource for multiplexing CSI reports, and receive a second configuration that identifies a second resource for multiplexing CSI reports, and the first set of CSI reports are transmitted, multiplexed in the first resource, to the first TRP, and the second set of CSI reports are transmitted, multiplexed in the second resource, to the second TRP.

In some implementations, the second configuration further identifies a third resource for multiplexing CSI reports, and the one or more instructions further cause the UE to select the second resource for transmitting the second set of CSI reports based on a determination that the third resource overlaps with the first resource in the slot, and the second resource does not overlap with the first resource in the slot.

In some implementations, the at least one configuration is a single configuration that identifies a first resource for multiplexing CSI reports that are to be transmitted to the first TRP and a second resource for multiplexing CSI reports that are to be transmitted to the second TRP, and the first set of CSI reports are transmitted, multiplexed in the first resource, to the first TRP, and the second set of CSI reports are transmitted, multiplexed in the second resource, to the second TRP.

Another innovative aspect of the subject matter described in this disclosure can be implemented in an apparatus for wireless communication. The apparatus may include means for receiving at least one configuration that identifies a resource for multiplexing CSI reports with a potential to collide in a slot; means for determining that multiple CSI reports of a first set of CSI reports that are to be transmitted to a first TRP, or a second set of CSI reports that are to be transmitted to a second TRP, have the potential to collide in the slot; and means for transmitting at least one of the first set of CSI reports to the first TRP or the second set of CSI reports to the second TRP according to the at least one configuration, where the first set of CSI reports or the second set of CSI reports are multiplexed in the resource.

In some implementations, the at least one configuration identifies a plurality of resources, and the apparatus may further include means for selecting the resource for multiplexing CSI reports based on a payload size of the first set of CSI reports or the second set of CSI reports.

In some implementations, the means for determining that multiple CSI reports have the potential to collide in the slot includes means for determining that a first CSI report and a second CSI report are scheduled in overlapping resources in the slot.

In some implementations, the apparatus may further include means for determining a first association between the first set of CSI reports and the first TRP and a second association between the second set of CSI reports and the second TRP.

In some implementations, the first association and the second association are determined based on at least one of: a first other configuration identifying a first resource for transmitting CSI reports as being associated with the first TRP and a second other configuration identifying a second resource for transmitting CSI reports as being associated with the second TRP; or another configuration that identifies a first CSI reporting configuration as being associated with the first TRP and a second CSI reporting configuration as being associated with the second TRP.

In some implementations, the apparatus may further include means for identifying, prior to transmitting the at least one of the first set of CSI reports or the second set of CSI reports, a non-ideal backhaul condition between the first TRP and the second TRP.

In some implementations, the non-ideal backhaul condition is identified based on at least one of: another configuration that indicates the non-ideal backhaul condition; another configuration that identifies different HARQ acknowledgment reports for the first TRP and the second TRP; a first other configuration identifying a first resource for transmitting CSI reports as being associated with the first TRP and a second other configuration identifying a second resource for transmitting CSI reports as being associated with the second TRP; or another configuration that identifies a first CSI reporting configuration as being associated with the first TRP and a second CSI reporting configuration as being associated with the second TRP.

In some implementations, the first set of CSI reports and the second set of CSI reports are transmitted in separate resources.

In some implementations, the second set of CSI reports is a subset of non-colliding CSI reports of a set of CSI reports having a plurality of CSI reports that have the potential to collide in the slot.

In some implementations, the second set of CSI reports includes one or more CSI reports that are selected according to one or more prioritization criteria from a set of CSI reports having a plurality of CSI reports that have the potential to collide in the slot.

In some implementations, the separate resources do not overlap.

In some implementations, the means for receiving the at least one configuration includes means for receiving a first configuration that identifies a first resource for multiplexing CSI reports, and receiving a second configuration that identifies a second resource for multiplexing CSI reports, and the first set of CSI reports are transmitted, multiplexed in the first resource, to the first TRP, and the second set of CSI reports are transmitted, multiplexed in the second resource, to the second TRP.

In some implementations, the second configuration further identifies a third resource for multiplexing CSI reports, and the apparatus may further include means for selecting the second resource for transmitting the second set of CSI reports based on a determination that the third resource overlaps with the first resource in the slot, and the second resource does not overlap with the first resource in the slot.

In some implementations, the at least one configuration is a single configuration that identifies a first resource for multiplexing CSI reports that are to be transmitted to the first TRP and a second resource for multiplexing CSI reports that are to be transmitted to the second TRP, and the first set of CSI reports are transmitted, multiplexed in the first resource, to the first TRP, and the second set of CSI reports are transmitted, multiplexed in the second resource, to the second TRP.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
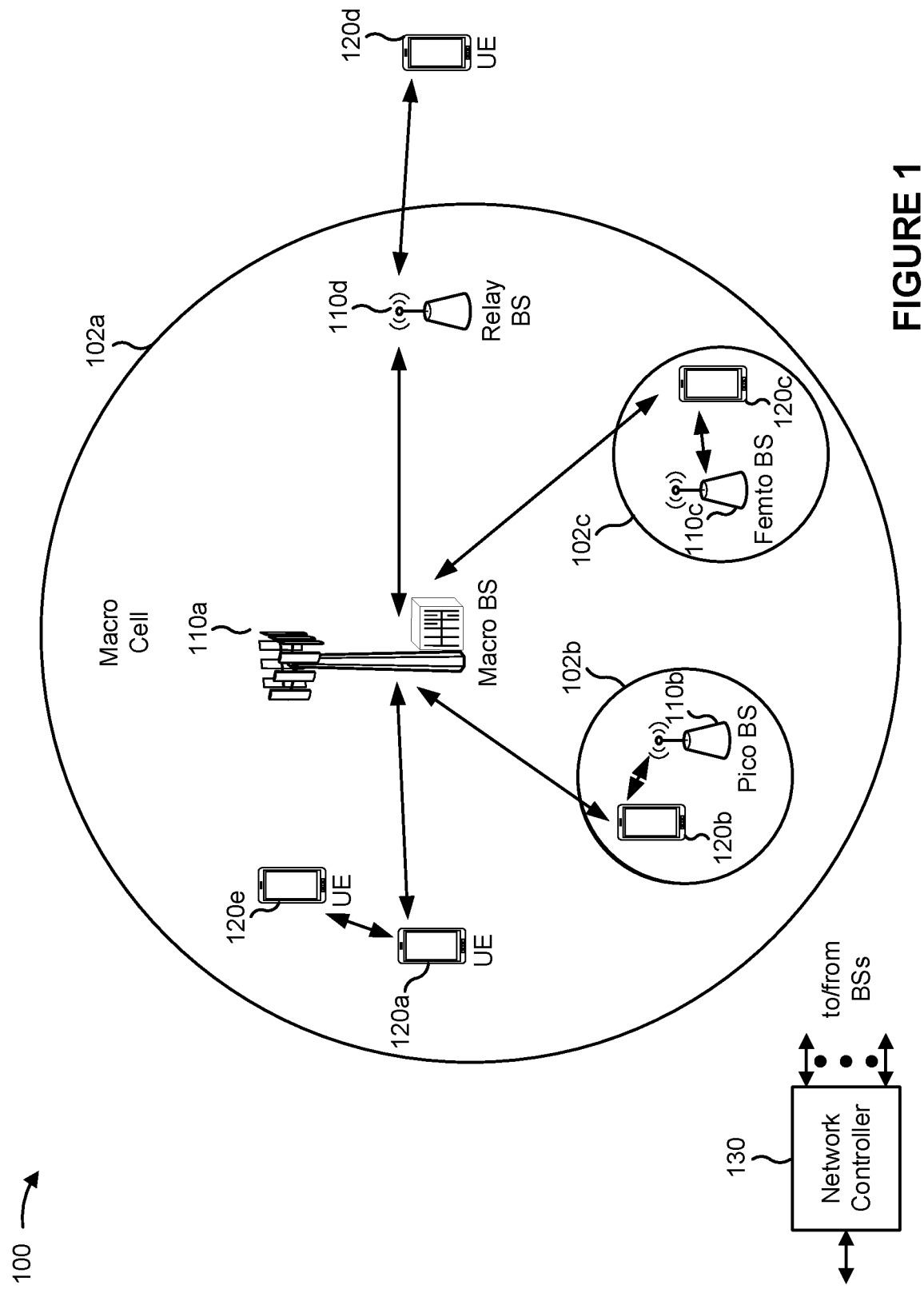
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless telecommunication systems, a user equipment (UE) may receive multiple downlink control information (DCI) communications from multiple transmit-receive points (TRPs), for example, to schedule downlink transmissions from the multiple TRPs to the UE. In such cases, the UE may monitor respective control resource sets (CORESETs) for the multiple DCI, where each CORESET is associated with a particular TRP. Moreover, in such cases, the UE may provide respective uplink transmissions to the multiple TRPs.

For example, the UE may transmit respective channel state information (CSI) reports to the multiple TRPs in one or more physical uplink control channels (PUCCHs). Sometimes, the UE may be scheduled to transmit multiple CSI reports to a TRP in overlapping resources, thereby resulting in a collision of the multiple CSI reports. In some wireless telecommunication systems, the UE may multiplex the multiple colliding CSI reports in a resource (such as a PUCCH resource) that is allocated to the UE in a configuration (such as in a multi-CSI-PUCCH-ResourceList field of a PUCCH configuration).

However, multiplexing CSI reports intended for multiple TRPs in the resource may prevent a TRP from identifying or decoding a CSI report that is intended for the TRP. For example, when the backhaul between TRPs is non-ideal (such as backhaul with a latency that fails to satisfy a threshold or that does not permit joint scheduling), a TRP may lack information on a scheduling decision of another TRP, and therefore the TRP may be unable to identify a CSI report that is intended for the TRP from a plurality of multiplexed CSI reports.

Some techniques and apparatuses described herein provide for multiplexing CSI reports in multiple TRP scenarios. For example, some techniques and apparatuses described herein provide for a UE to receive at least one configuration that identifies one or more resources (such as in a multi-CSI-PUCCH-ResourceList field of a PUCCH configuration) for multiplexing CSI reports with a potential to collide in a slot (such as CSI reports scheduled on overlapping PUCCH resources in a slot).

In some aspects, the UE may receive such a configuration from a first TRP and may not receive such a configuration from a second TRP. Accordingly, the UE may transmit CSI reports to the first TRP multiplexed in a resource identified in the configuration, and may transmit CSI reports to the second TRP which is not multiplexed in a resource (such as in respective resources originally allocated for such CSI reports in CSI reporting configurations). The UE may select, for transmission to the second TRP, one or more CSI reports that are scheduled in non-overlapping resources, for example, according to one or more prioritization criteria.

In some aspects, the UE may receive a first configuration from the first TRP that identifies one or more first resources for multiplexing CSI reports intended for the first TRP, and may receive a second configuration from the second TRP that identifies one or more second resources for multiplexing CSI reports intended for the second TRP. Alternatively, the UE may receive a single configuration, from either of the first TRP or the second TRP, that identifies one or more first resources for multiplexing CSI reports intended for the first TRP and one or more second resources for multiplexing CSI reports intended for the second TRP. In either scenario, the UE may transmit CSI reports to the first TRP multiplexed in a first resource of the one or more first resources, and may transmit CSI reports to the second TRP multiplexed in a second resource of the one or more second resources. In such cases, the UE may select the first resource and the second resource based on a payload size of the CSI reports or based on a determination that the first resource and the second resource are non-overlapping.

Particular implementations of the subject matter described in this disclosure can be implemented to realize one or more of the following potential advantages. The UE may multiplex sets of CSI reports that are respectively intended for multiple TRPs in separate resources. This enables identification, differentiation, and decoding of a set of CSI reports by a TRP, which may otherwise not be enabled when sets of CSI reports that are respectively intended for multiple TRPs are multiplexed in the same resource. Moreover, the UE may transmit a multiplexed set of CSI reports to a TRP using transmissions parameters (such as, a beam or a transmit power, among other examples) that are particular to the TRP, thereby potentially improving a performance and a reliability of the transmission. Some implementations described herein provide for multiplexing of sets of CSI reports, respectively intended for multiple TRPs, in non-ideal backhaul conditions. In this case, a TRP may receive CSI reports with reduced latency, thereby improving a relevance of the CSI for determining current channel conditions. In contrast, when sets of CSI reports that are respectively intended for multiple TRPs are multiplexed in the same resource, a first TRP may decode CSI for a second TRP and transmit the CSI to the second TRP, which may increase latency in non-ideal backhaul conditions. Moreover, by multiplexing sets of CSI reports, collisions between CSI reports may be avoided without dropping one or more CSI reports, thereby improving a reliability and a robustness of CSI reporting.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay BS 110d may communicate with macro BS 110a and a UE 120d in order to facilitate communication between BS 110a and UE 120d. A relay BS also may be referred to as a relay station, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 watts) whereas pico BSs, femto BSs, and relay BSs may have lower transmit power levels (for example, 0.1 to 2 watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
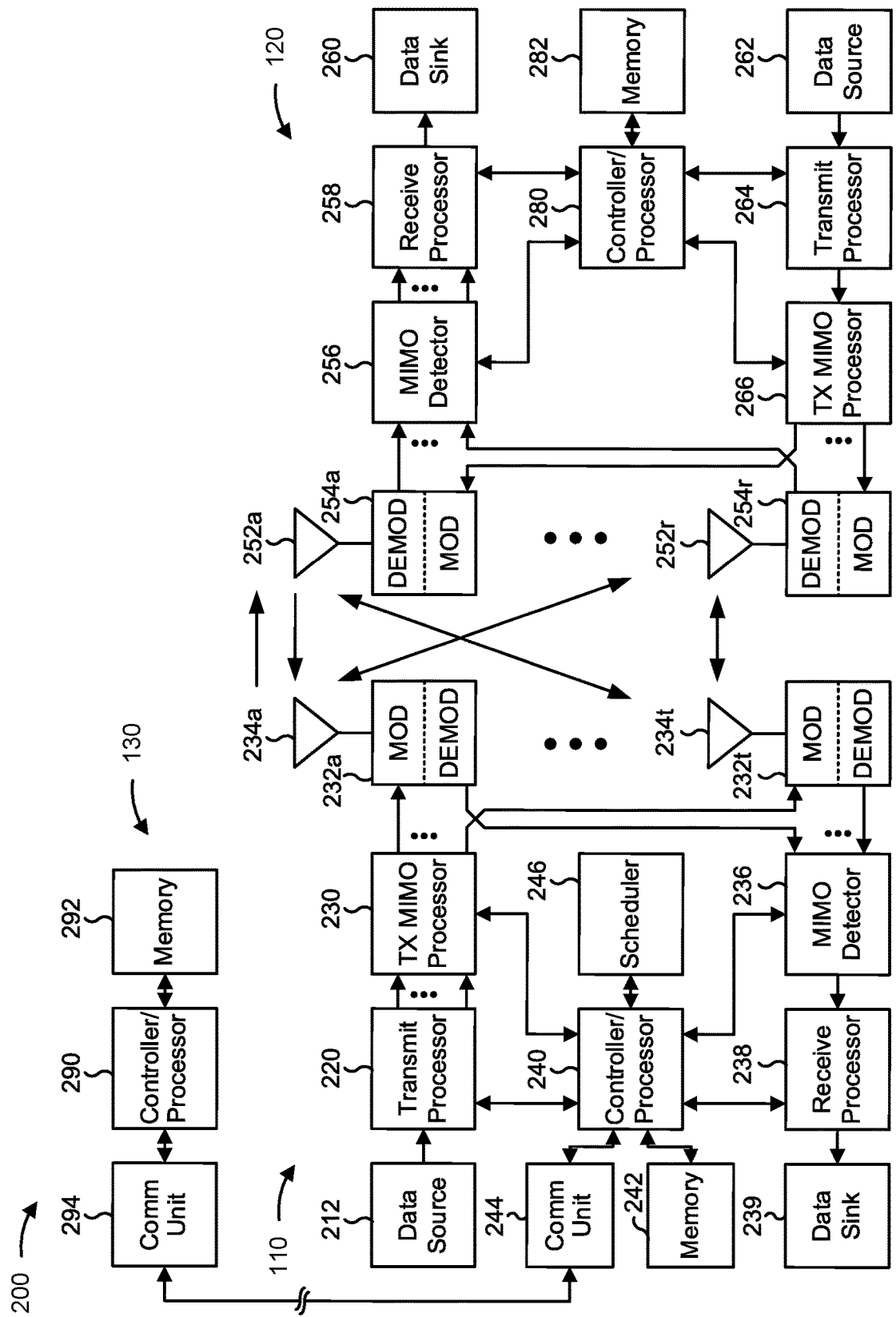
FIG. 2 is a block diagram conceptually illustrating an example of a base station (BS) in communication with a user equipment (UE) in a wireless network.

FIG. 2 is a block diagram conceptually illustrating an example 200 of a base station (BS) 110 in communication with a user equipment (UE) 120. In some aspects, base station 110 and UE 120 may respectively be one of the base stations and one of the UEs in wireless network 100 of FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (controller/processor) 240. The base station 110 may include communication unit 244 and communicate to network controller 130 via communication unit 244. The network controller 130 may include communication unit 294, a controller or processor (controller/processor) 290, and memory 292.

In some implementations, the controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

The controller/processor 240 of base station 110, the controller/processor 280 of UE 120, or any other component(s) of FIG. 2 may perform one or more techniques associated with multiplexing CSI reports in multiple TRP scenarios, as described in more detail elsewhere herein. For example, the controller/processor 240 of base station 110, the controller/processor 280 of UE 120, or any other component(s) (or combinations of components) of FIG. 2 may perform or direct operations of, for example, process 800 of FIG. 8, or other processes as described herein. The memories 242 and 282 may store data and program codes for base station 110 and UE 120, respectively. A scheduler 246 may schedule UEs for data transmission on the downlink, the uplink, or a combination thereof.

Figure 8:
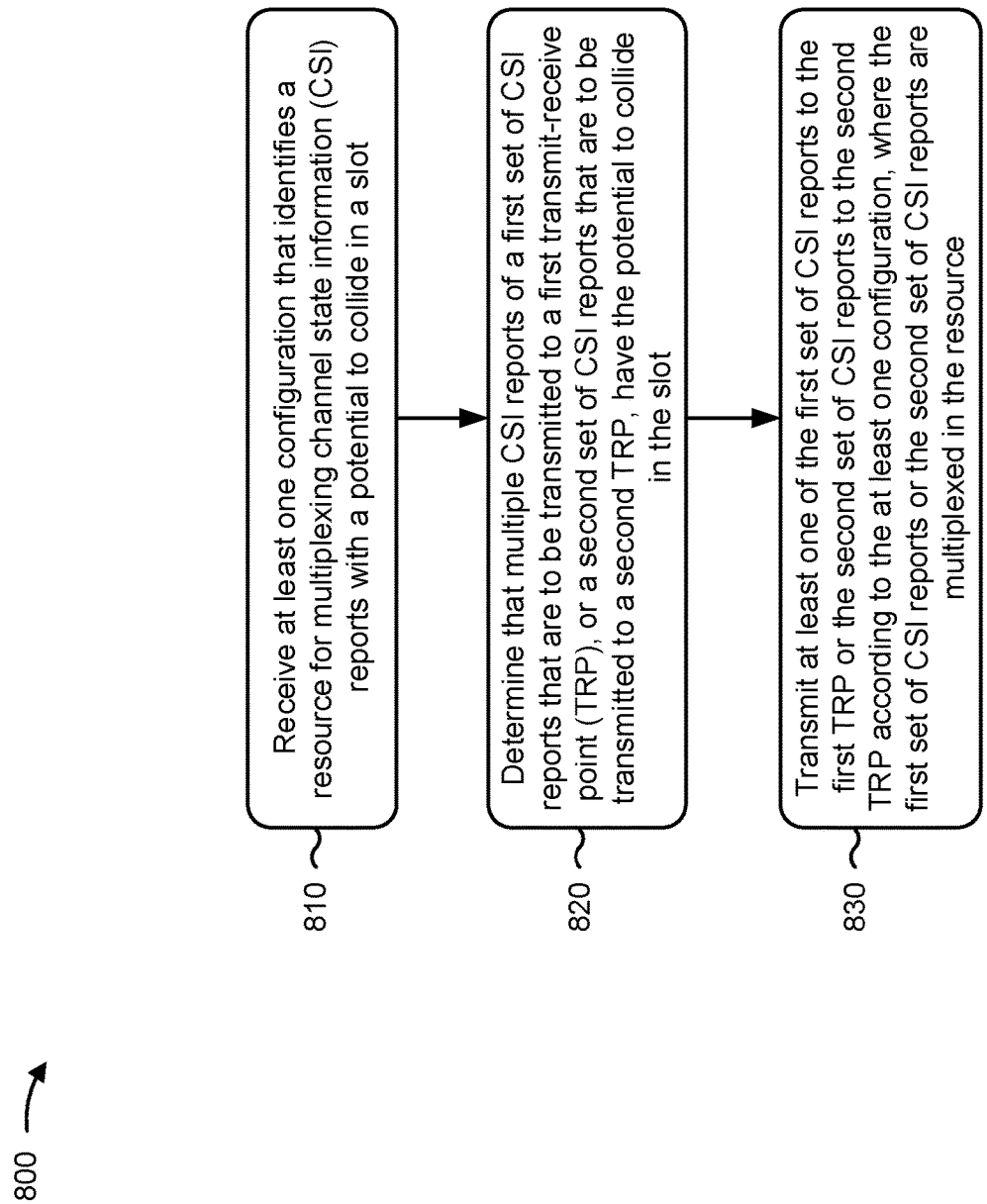
FIG. 8 is a diagram illustrating an example process performed, for example, by a UE.

The stored program codes, when executed by the controller/processor 280 or other processors and modules at UE 120, may cause the UE 120 to perform operations described with respect to process 800 of FIG. 8, or other processes as described herein.

In some aspects, UE 120 may include means for receiving (using antenna 252, DEMOD 254, MIMO detector 256, receive processor 258, or controller/processor 280, among other examples) at least one configuration that identifies a resource for multiplexing CSI reports with a potential to collide in a slot, means for determining (using controller/processor 280 or memory 282, among other examples) that multiple CSI reports of a first set of CSI reports that are to be transmitted to a first TRP, or a second set of CSI reports that are to be transmitted to a second TRP, have the potential to collide in the slot, means for transmitting (using controller/processor 280, transmit processor 264, TX MIMO processor 266, MOD 254, or antenna 252, among other examples) at least one of the first set of CSI reports to the first TRP, or the second set of CSI reports to the second TRP, according to the at least one configuration, where the first set of CSI reports or the second set of CSI reports are multiplexed in the resource, among other examples, or combinations thereof. In some aspects, such means may include one or more components of UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
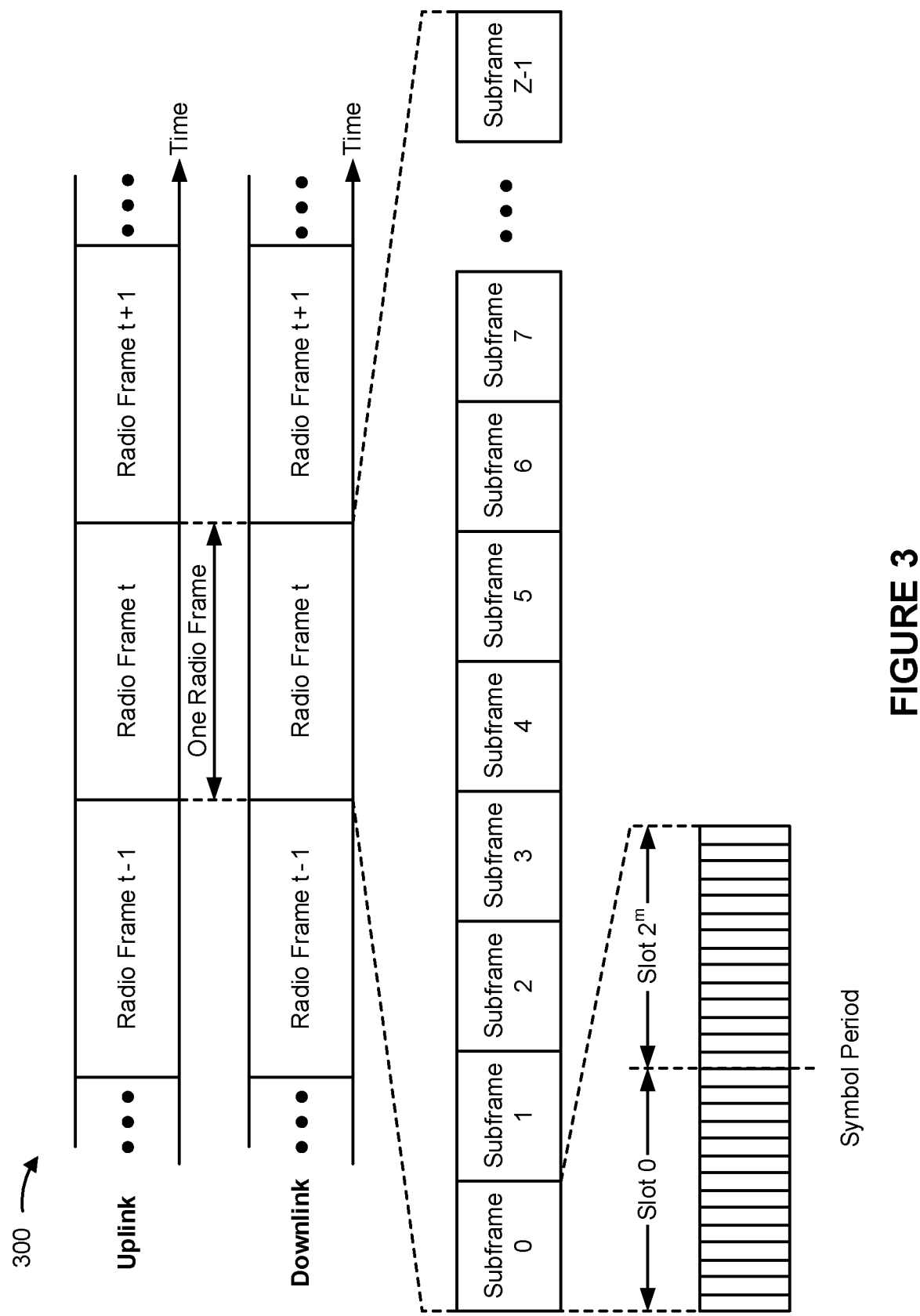
FIG. 3 is a block diagram conceptually illustrating an example of a frame structure in a wireless network.

FIG. 3 is a block diagram conceptually illustrating an example frame structure 300 in a wireless network. In some aspects, frame structure 300 may be for frequency division duplexing (FDD) in the wireless network, which may include a 5G NR wireless network or another type of wireless network. The transmission timeline for each of the downlink and uplink may be partitioned into units of radio frames (sometimes referred to as frames). Each radio frame may have a predetermined duration (for example, 10 milliseconds (ms)) and may be partitioned into a set of Z (Z≥1) subframes (for example, with indices of 0 through Z−1). Each subframe may have a predetermined duration (for example, 1 ms) and may include a set of slots (for example, $2^m$ slots per subframe are shown in FIG. 3, where m is a numerology used for a transmission, such as 0, 1, 2, 3, or 4, among other examples). Each slot may include a set of L symbol periods. For example, each slot may include fourteen symbol periods (for example, as shown in FIG. 3), seven symbol periods, or another number of symbol periods. In a case where the subframe includes two slots (for example, when m=1), the subframe may include 2L symbol periods, where the 2L symbol periods in each subframe may be assigned indices of 0 through 2L−1. In some aspects, a scheduling unit for the FDD may frame-based, subframe-based, slot-based, or symbol-based, among other examples.

While some techniques are described herein in connection with frames, subframes, or slots, among other examples, these techniques may equally apply to other types of wireless communication structures, which may be referred to using terms other than "frame," "subframe," or "slot," among other examples, in 5G NR. In some aspects, a wireless communication structure may refer to a periodic time-bounded communication unit defined by a wireless communication standard or protocol. Additionally, or alternatively, different configurations of wireless communication structures than those shown in FIG. 3 may be used.

Figure 4:
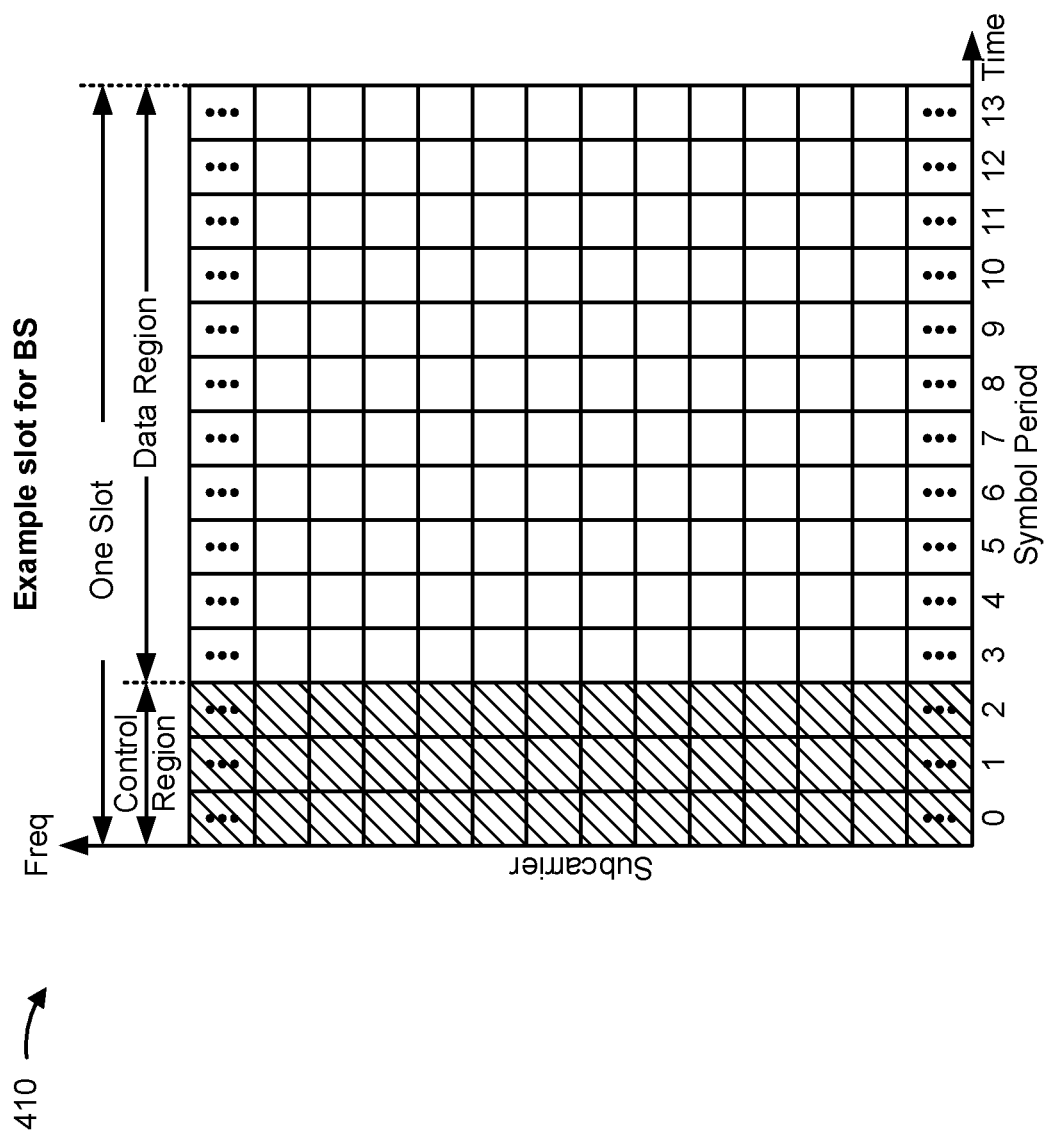
FIG. 4 is a block diagram conceptually illustrating an example slot format with a normal cyclic prefix.

FIG. 4 is a block diagram conceptually illustrating an example slot format 410 with a normal cyclic prefix. The available time frequency resources may be partitioned into resource blocks. Each resource block may cover a set of subcarriers (for example, 12 subcarriers) in one slot and may include a number of resource elements. Each resource element may cover one subcarrier in one symbol period (for example, in time) and may be used to send one modulation symbol, which may be a real or complex value.

An interlace structure may be used for each of the downlink and uplink for FDD in certain telecommunications systems (for example, NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based on various criteria such as received signal strength, received signal quality, or path loss, among other examples, or combinations thereof. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (for example, other than Orthogonal Frequency Divisional Multiple Access (OFDMA)-based air interfaces) or fixed transport layer (for example, other than Internet Protocol (IP)). In aspects, NR may utilize OFDM with a CP (herein referred to as cyclic prefix OFDM or CP-OFDM) or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (for example, 80 megahertz (MHz) and beyond), millimeter wave (mmW) targeting high carrier frequency (for example, 60 gigahertz (GHz)), massive MTC (mMTC) targeting non-backward compatible MTC techniques, or mission critical targeting ultra-reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (for example, DL or UL) for data transmission and the link direction for each slot may be dynamically switched. Each slot may include DL/UL data as well as DL/UL control data.

Beamforming may be supported and beam direction may be dynamically configured. MIMO transmissions with precoding also may be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

Figure 5:
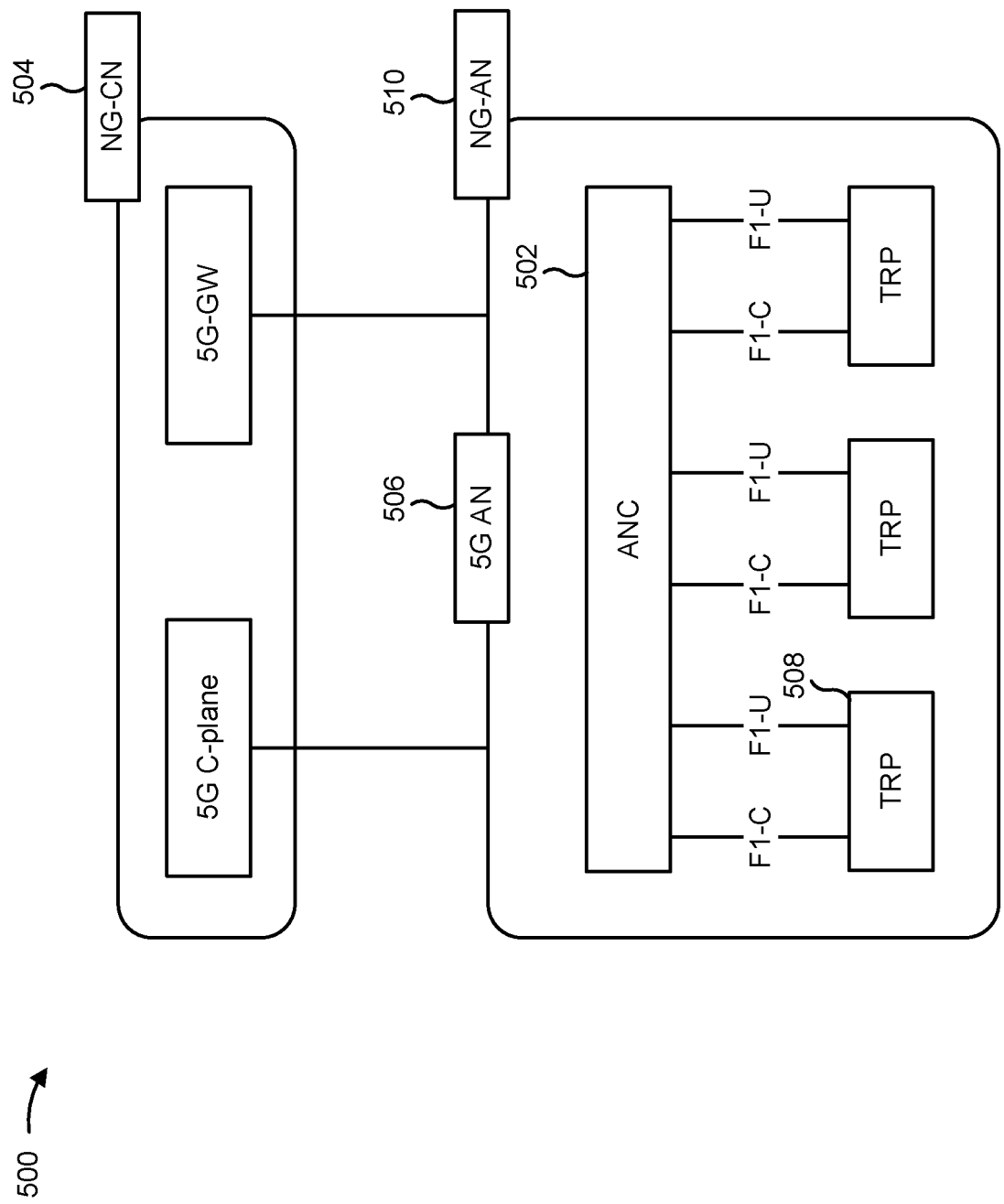
FIG. 5 illustrates an example logical architecture of a distributed radio access network (RAN).

FIG. 5 illustrates an example logical architecture of a distributed RAN 500. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which also may be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (for example, dynamic selection) or jointly (for example, joint transmission) serve traffic to a UE.

The local architecture of RAN 500 may be used to illustrate fronthaul definition. The architecture may be defined that support fronthauling solutions across different deployment types. For example, the architecture may be based on transmit network capabilities (for example, bandwidth, latency, jitter, etc.).

The architecture may share features or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), medium access control (MAC) protocol may be adaptably placed at the ANC or TRP.

According to various aspects, a BS may include a central unit (CU) (for example, ANC 502) or one or more distributed units (for example, one or more TRPs 508).

Figure 6:
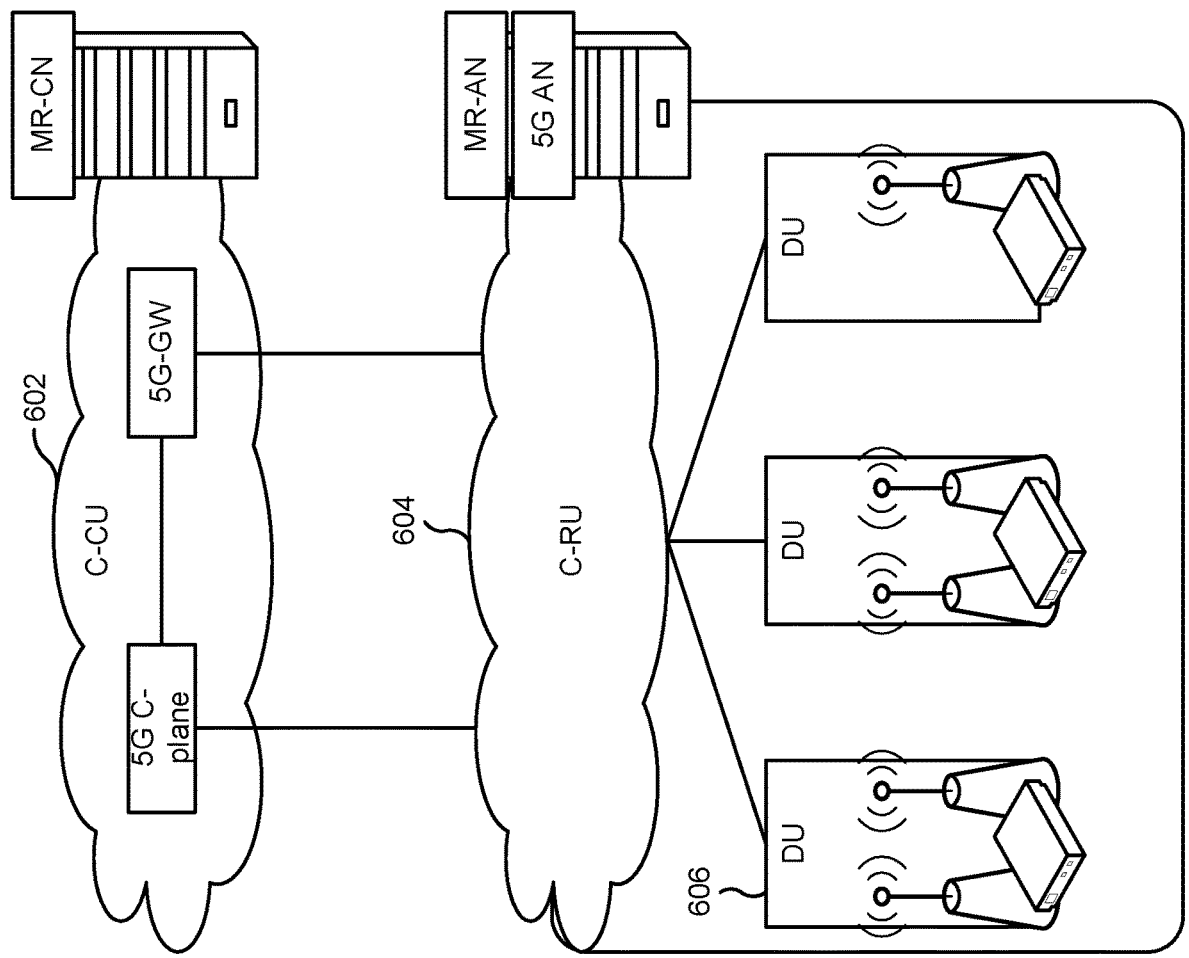
FIG. 6 illustrates an example physical architecture of a distributed RAN.

FIG. 6 illustrates an example physical architecture of a distributed RAN 600. A centralized core network unit (C-CU) 602 may host core network functions. The C-CU may be centrally deployed. C-CU functionality may be offloaded (for example, to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

Figure 7:
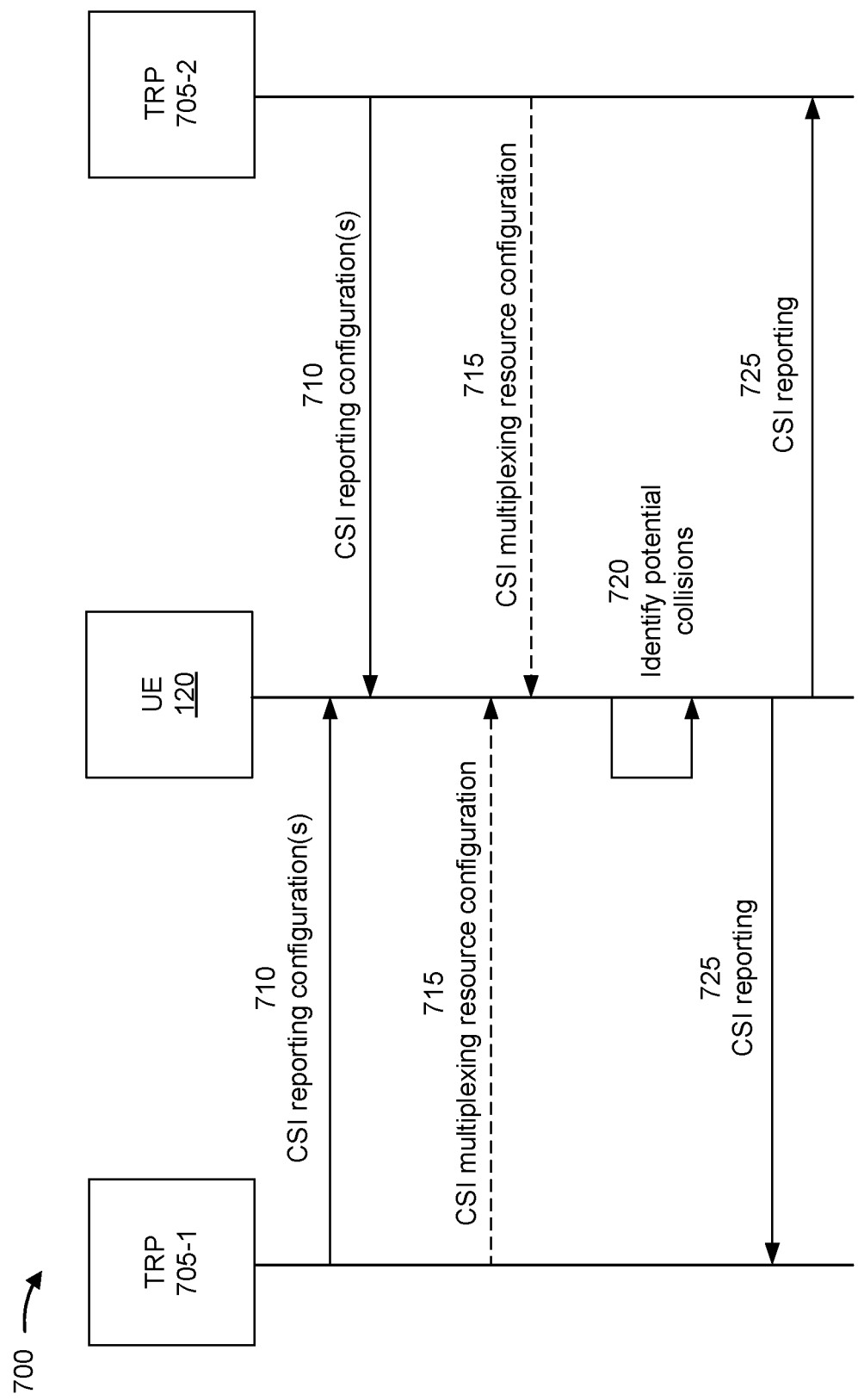
FIG. 7 is a diagram illustrating an example of multiplexing channel state information reports in multiple transmit-receive point (TRP) scenarios.

FIG. 7 is a diagram illustrating an example 700 of multiplexing CSI reports in multiple TRP scenarios. As shown in FIG. 7, a UE 120 may communicate with a first TRP 705-1 and a second TRP 705-2 in connection with CSI reporting. In some aspects, the first TRP 705-1 or the second TRP 705-2 may correspond to a base station 110, as depicted and described in FIG. 1, or a TRP 508, as depicted and described in FIG. 5.

As shown in FIG. 7, and by reference number 710, the UE 120 may receive CSI reporting configurations from the first TRP 705-1 or the second TRP 705-2. The CSI reporting configurations may identify one or more resources in which the UE 120 is to transmit CSI reports. In some aspects, a resource identified by a CSI reporting configuration may be associated with a particular TRP 705. For example, the CSI reporting configuration may associate the resource with an identifier (such as an index value) that corresponds to the particular TRP 705 (in such a case, the identifier may be also associated with a CORESET associated with the particular TRP 705). In this way, the UE 120 may identify an association between one or more CSI reports scheduled by a CSI reporting configuration and a particular TRP 705 for which the one or more CSI reports are intended. In some aspects, a CSI reporting configuration may be associated with an identifier (such as an index value) that enables the UE 120 to identify an association between one or more CSI reports scheduled by a CSI reporting configuration and a particular TRP 705 for which the one or more CSI reports are intended (for example, the identifier is also associated with a CORESET associated with the particular TRP 705).

In addition, the UE 120 may identify a non-ideal backhaul condition between the first TRP and the second TRP. For example, the UE 120 may identify the non-ideal backhaul condition based on CSI reporting configurations associating respective resources with either of the first TRP 705-1 or the second TRP 705-2 (in such a case, a PUCCH resource may have a configured association with an index value that corresponds to the first TRP 70-51 or the second TRP 705-2), based on CSI reporting configurations being associated with either of the first TRP 705-1 or the second TRP 705-2 (in such a case, a CSI reporting configuration may have a configured association with an index value that corresponds to the first TRP 70-51 or the second TRP 705-2), based on an explicit indication of the non-ideal backhaul condition (such as in a radio resource control configuration), or based on a configuration of different hybrid automatic repeat request (HARQ) acknowledgment reports for the first TRP 705-1 and the second TRP 705-2. Based on determining the non-ideal backhaul condition, the UE 120 may determine that CSI reports intended for the first TRP 705-1 and the second TRP 705-2 are not to be multiplexed in the same resource.

As shown by reference number 715, the UE 120 may receive a CSI multiplexing resource configuration from the first TRP 705-1 or the second TRP 705-2. A CSI multiplexing resource configuration may identify one or more resources that the UE 120 is to use for multiplexing CSI reports. For example, a CSI multiplexing resource configuration received from the first TRP 705-1 may identify one or more resources that the UE 120 is to use for multiplexing CSI reports that are to be transmitted to the first TRP 705-1.

In some aspects, the UE 120 may receive a CSI multiplexing resource configuration from the first TRP 705-1, that identifies one or more resources for multiplexing CSI reports intended for the first TRP 705-1, and may not receive a CSI multiplexing resource configuration from the second TRP 705-2. In some aspects, the UE 120 may receive a first CSI multiplexing resource configuration from the first TRP 705-1, that identifies one or more first resources for multiplexing CSI reports intended for the first TRP, and may receive a second CSI multiplexing resource configuration from the second TRP 705-2 that identifies one or more second resources for multiplexing CSI reports intended for the second TRP. In some aspects, the UE 120 may receive a single CSI multiplexing resource configuration, from either of the first TRP 705-1 or the second TRP 705-2, that identifies one or more first resources for multiplexing CSI reports intended for the first TRP 705-1 and one or more second resources for multiplexing CSI reports intended for the second TRP 705-2.

As shown by reference number 720, the UE 120 may identify one or more potential collisions between CSI reports that are scheduled to be transmitted in the same slot. For example, the UE 120 may identify a potential collision based on a determination that a first CSI report is to be transmitted in a first PUCCH resource (according to a CSI reporting configuration) that overlaps with a second PUCCH resource in which a second CSI report is to be transmitted (according to a CSI reporting configuration). As an example, one or more CSI reporting configurations received by the UE 120 from the first TRP 705-1 may schedule CSI reports for the first TRP 705-1 in the same first slot (such as in overlapping PUCCH resources). As another example, one or more CSI reporting configurations received by the UE 120 from the second TRP 705-2 may schedule CSI reports for the second TRP 705-2 in the same second slot (such as in overlapping PUCCH resources). Thus, for example, the first CSI report and the second CSI report, with the potential to collide, may be for the first TRP 705-1 or may be for the second TRP 705-2.

In such a case, the UE 120 may determine that CSI reports having the potential to collide are to be multiplexed according to a CSI multiplexing resource configuration. In some aspects, the UE 120 may determine an association between the colliding CSI reports and a particular TRP 705 (for example, based on the CSI reporting configurations, as described above). For example, the UE 120 may determine that a first set of the colliding CSI reports are associated with the first TRP 705-1 (such as, if PUCCH resources for the first set of colliding CSI reports are associated with an index value that is also associated with a CORESET associated with the first TRP 705-1), and may determine that a second set of colliding CSI reports are associated with the second TRP 705-2 (such as, if PUCCH resources for the second set of colliding CSI reports are associated with an index value that is also associated with a CORESET associated with the second TRP 705-2).

In some aspects, the UE 120 may select, for multiplexing CSI reports, a particular resource from a plurality of resources identified in a CSI multiplexing resource configuration. For example, the UE 120 may select the particular resource based on a payload size of the CSI reports that are to be multiplexed. In some aspects, the UE 120 may select a first resource from a plurality of resources identified in the first CSI multiplexing resource configuration received from the first TRP 705-1, and may select a second resource from a plurality of resources identified in the second CSI multiplexing resource configuration received from the second TRP 705-2. In such a case, the first resource and the second resource may be non-overlapping.

As shown by reference number 725, the UE 120 may transmit a first set of CSI reports to the first TRP 705-1, and may transmit a second set of CSI reports to the second TRP 705-2. The UE 120 may transmit the first set of CSI reports and the second set of CSI reports in accordance with one or more CSI multiplexing resource configurations received from the first TRP 705-1 or the second TRP 705-2.

In some implementations, the UE 120 may receive a CSI multiplexing resource configuration from the first TRP 705-1, that identifies one or more resources for multiplexing CSI reports intended for the first TRP 705-1, and may not receive a CSI multiplexing resource configuration from the second TRP 705-2. Accordingly, the UE 120 may transmit the first set of CSI reports to the first TRP 705-1, multiplexed in a resource identified in the CSI multiplexing resource configuration, and may transmit the second set of CSI reports to the second TRP without multiplexing.

For example, the UE 120 may transmit the second set of CSI reports to the second TRP 705-2 in respective resources allocated for such CSI reports in one or more CSI reporting configurations, as described above. The UE 120 may select, for inclusion in the second set of CSI reports, one or more CSI reports that are scheduled (such as by one or more CSI reporting configurations) in non-overlapping PUCCH resources. In some cases, the UE 120 may select the one or more CSI reports that are scheduled in non-overlapping resources according to one or more prioritization criteria. In some aspects, the UE 120 may select, for inclusion in the second set of CSI reports, one or more CSI reports that are scheduled (such as by one or more CSI reporting configurations) in PUCCH resources that do not overlap with the resource in which the multiplexed CSI reports are transmitted to the first TRP 705-1.

In some other aspects, the UE 120 may receive a first CSI multiplexing resource configuration from the first TRP 705-1 that identifies one or more first resources for multiplexing CSI reports intended for the first TRP 705-1, and may receive a second CSI multiplexing resource configuration from the second TRP 705-2 that identifies one or more second resources for multiplexing CSI reports intended for the second TRP 705-2. Alternatively, the UE 120 may receive a single CSI multiplexing resource configuration, from either of the first TRP 705-1 or the second TRP 705-2, that identifies one or more first resources for multiplexing CSI reports intended for the first TRP 705-1 and one or more second resources for multiplexing CSI reports intended for the second TRP 705-2.

In either scenario, the UE 120 may transmit CSI reports to the first TRP 705-1 multiplexed in a first resource of the one or more first resources, and may transmit CSI reports to the second TRP 705-2 multiplexed in a second resource of the one or more second resources. In such cases, the UE 120 may select the first resource and the second resource based on a payload size of the CSI reports, or based on a determination that the first resource and the second resource are non-overlapping. In some aspects, the UE 120 may select the first resource for transmitting the first set of CSI reports and may select between the second resource and a third resource (of the one or more second resources) for transmitting the second set of CSI reports based on whether the second resource or the third resource overlaps with the first resource.

In some aspects, the UE 120 may determine that the first set of CSI reports that are to be transmitted in the first resource or the second set of CSI reports that are to be transmitted in the second resource have a potential to collide with an uplink control information (UCI) communication or a physical uplink shared channel (PUSCH) communication. In such aspects, the UE 120 may resolve the potential collision between CSI reports and UCI or a PUSCH on a per-TRP 705 basis, in a manner similar to that described herein for resolving potential collisions between CSI reports.

FIG. 8 is a diagram illustrating an example process 800 performed, for example, by a UE. The process 800 shows where a UE, such as UE 120, performs operations associated with multiplexing CSI reports in multiple TRP scenarios.

As shown in FIG. 8, in some aspects, the process 800 may include receiving at least one configuration that identifies a resource for multiplexing CSI reports with a potential to collide in a slot (block 810). For example, the UE (using an interface of the UE, antenna 252, DEMOD 254, MIMO detector 256, receive processor 258, or controller/processor 280, among other examples) may receive at least one configuration that identifies a resource for multiplexing CSI reports with a potential to collide in a slot, as described above.

As shown in FIG. 8, in some aspects, the process 800 may include determining that multiple CSI reports of a first set of CSI reports that are to be transmitted to a first TRP, or a second set of CSI reports that are to be transmitted to a second TRP, have the potential to collide in the slot (block 820). For example, the UE (using a processing system of the UE or controller/processor 280, among other examples) may determine that multiple CSI reports of a first set of CSI reports that are to be transmitted to a first TRP, or a second set of CSI reports that are to be transmitted to a second TRP, have the potential to collide in the slot, as described above.

As shown in FIG. 8, in some aspects, the process 800 may include transmitting at least one of the first set of CSI reports to the first TRP or the second set of CSI reports to the second TRP according to the at least one configuration, where the first set of CSI reports or the second set of CSI reports are multiplexed in the resource (block 830). For example, the UE (using an interface of the UE, controller/processor 280, transmit processor 264, TX MIMO processor 266, MOD 254, or antenna 252, among other examples) may transmit at least one of the first set of CSI reports to the first TRP or the second set of CSI reports to the second TRP according to the at least one configuration, as described above. In some aspects, the first set of CSI reports or the second set of CSI reports are multiplexed in the resource.

The process 800 may include additional aspects, such as any single aspect or any combination of aspects described below or in connection with one or more other processes described elsewhere herein.

In a first aspect, the at least one configuration identifies a plurality of resources, and the process 800 further includes selecting (using controller/processor 280 or memory 282, among other examples) the resource for multiplexing CSI reports based on a payload size of the first set of CSI reports or the second set of CSI reports. In a second aspect, alone or in combination with the first aspect, determining that multiple CSI reports have the potential to collide in the slot includes determining that a first CSI report and a second CSI report are scheduled in overlapping resources in the slot.

In a third aspect, alone or in combination with one or more of the first and second aspects, the process 800 further includes determining (using controller/processor 280 or memory 282, among other examples) a first association between the first set of CSI reports and the first TRP and a second association between the second set of CSI reports and the second TRP. In a fourth aspect, alone or in combination with one or more of the first through third aspects, the first association and the second association are determined based on at least one of a first other configuration identifying a first resource for transmitting CSI reports as being associated with the first TRP and a second other configuration identifying a second resource for transmitting CSI reports as being associated with the second TRP, or another configuration that identifies a first CSI reporting configuration as being associated with the first TRP and a second CSI reporting configuration as being associated with the second TRP.

In a fifth aspect, alone or in combination with one or more of the first through fourth aspects, the process 800 further includes identifying (using controller/processor 280 or memory 282, among other examples), prior to transmitting the at least one of the first set of CSI reports or the second set of CSI reports, a non-ideal backhaul condition between the first TRP and the second TRP. In a sixth aspect, alone or in combination with one or more of the first through fifth aspects, the non-ideal backhaul condition is identified based on at least one of another configuration that indicates the non-ideal backhaul condition, another configuration that identifies different hybrid automatic repeat request (HARQ) acknowledgment reports for the first TRP and the second TRP, a first other configuration identifying a first resource for transmitting CSI reports as being associated with the first TRP and a second other configuration identifying a second resource for transmitting CSI reports as being associated with the second TRP, or another configuration that identifies a first CSI reporting configuration as being associated with the first TRP and a second CSI reporting configuration as being associated with the second TRP.

In a seventh aspect, alone or in combination with one or more of the first through sixth aspects, the first set of CSI reports and the second set of CSI reports are transmitted in separate resources. In an eighth aspect, alone or in combination with one or more of the first through seventh aspects, the second set of CSI reports is a subset of non-colliding CSI reports of a set of CSI reports having a plurality of CSI reports that have the potential to collide in the slot. In a ninth aspect, alone or in combination with one or more of the first through eighth aspects, the second set of CSI reports includes one or more CSI reports that are selected according to one or more prioritization criteria from a set of CSI reports having a plurality of CSI reports that have the potential to collide in the slot. In a tenth aspect, alone or in combination with one or more of the first through ninth aspects, the separate resources do not overlap.

In an eleventh aspect, alone or in combination with one or more of the first through tenth aspects, receiving the at least one configuration includes receiving a first configuration that identifies a first resource for multiplexing CSI reports, and receiving a second configuration that identifies a second resource for multiplexing CSI reports, and the first set of CSI reports are transmitted, multiplexed in the first resource, to the first TRP, and the second set of CSI reports are transmitted, multiplexed in the second resource, to the second TRP. In a twelfth aspect, alone or in combination with one or more of the first through eleventh aspects, the second configuration further identifies a third resource for multiplexing CSI reports, and the process 800 further includes selecting (using controller/processor 280 or memory 282, among other examples) the second resource for transmitting the second set of CSI reports based on a determination that the third resource overlaps with the first resource in the slot, and the second resource does not overlap with the first resource in the slot.

In a thirteenth aspect, alone or in combination with one or more of the first through twelfth aspects, the at least one configuration is a single configuration that identifies a first resource for multiplexing CSI reports that are to be transmitted to the first TRP and a second resource for multiplexing CSI reports that are to be transmitted to the second TRP, and the first set of CSI reports are transmitted, multiplexed in the first resource, to the first TRP, and the second set of CSI reports are transmitted, multiplexed in the second resource, to the second TRP.

Although FIG. 8 shows example blocks of the process 800, in some aspects, the process 800 may include additional blocks, fewer blocks, different blocks, or differently arranged blocks than those depicted in FIG. 8. Additionally, or alternatively, two or more of the blocks of the process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, that is, one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:
    receiving an indication of a non-ideal backhaul condition between a first transmit-receive point (TRP) and a second TRP;
    receiving at least one configuration that identifies a resource for multiplexing channel state information (CSI) reports with a potential to collide in a slot;
    determining that multiple CSI reports of a first set of CSI reports that are to be transmitted to the first TRP, or of a second set of CSI reports that are to be transmitted to the second TRP, have the potential to collide in the slot; and
    transmitting at least one of the first set of CSI reports to the first TRP or the second set of CSI reports to the second TRP according to the at least one configuration, wherein the first set of CSI reports or the second set of CSI reports are multiplexed in the resource.

2. The method of claim 1, wherein the at least one configuration identifies a plurality of resources, and
    wherein the method further comprises selecting the resource for multiplexing CSI reports based on a payload size of the first set of CSI reports or the second set of CSI reports.

3. The method of claim 1, wherein determining that multiple CSI reports have the potential to collide in the slot comprises determining that a first CSI report and a second CSI report are scheduled in overlapping resources in the slot.

4. The method of claim 1, further comprising determining a first association between the first set of CSI reports and the first TRP and a second association between the second set of CSI reports and the second TRP.

5. The method of claim 4, wherein the first association and the second association are determined based on at least one of:
    a first other configuration identifying a first resource for transmitting CSI reports as being associated with the first TRP and a second other configuration identifying a second resource for transmitting CSI reports as being associated with the second TRP; or
    another configuration that identifies a first CSI reporting configuration as being associated with the first TRP and a second CSI reporting configuration as being associated with the second TRP.

6. The method of claim 1, wherein the indication of the non-ideal backhaul condition is received prior to transmitting the at least one of the first set of CSI reports or the second set of CSI reports.

7. The method of claim 1, wherein the non-ideal backhaul condition is indicated based on at least one of:
    another configuration that indicates the non-ideal backhaul condition;
    another configuration that identifies different hybrid automatic repeat request (HARQ) acknowledgment reports for the first TRP and the second TRP;
    a first other configuration identifying a first resource for transmitting CSI reports as being associated with the first TRP and a second other configuration identifying a second resource for transmitting CSI reports as being associated with the second TRP; or
    another configuration that identifies a first CSI reporting configuration as being associated with the first TRP and a second CSI reporting configuration as being associated with the second TRP.

8. The method of claim 1, wherein the first set of CSI reports and the second set of CSI reports are transmitted in separate resources.

9. The method of claim 8, wherein the second set of CSI reports is a subset of non-colliding CSI reports of a set of CSI reports having a plurality of CSI reports that have the potential to collide in the slot.

10. The method of claim 8, wherein the second set of CSI reports includes one or more CSI reports that are selected according to one or more prioritization criteria from a set of CSI reports having a plurality of CSI reports that have the potential to collide in the slot.

11. The method of claim 8, wherein the separate resources do not overlap.

12. The method of claim 1, wherein receiving the at least one configuration includes receiving a first configuration that identifies a first resource for multiplexing CSI reports, and receiving a second configuration that identifies a second resource for multiplexing CSI reports, and
    wherein the first set of CSI reports are transmitted, multiplexed in the first resource, to the first TRP, and the second set of CSI reports are transmitted, multiplexed in the second resource, to the second TRP.

13. The method of claim 12, wherein the second configuration further identifies a third resource for multiplexing CSI reports, and
    wherein the method further comprises selecting the second resource for transmitting the second set of CSI reports based on a determination that the third resource overlaps with the first resource in the slot, and the second resource does not overlap with the first resource in the slot.

14. The method of claim 1, wherein the at least one configuration is a single configuration that identifies a first resource for multiplexing CSI reports that are to be transmitted to the first TRP and a second resource for multiplexing CSI reports that are to be transmitted to the second TRP, and
    wherein the first set of CSI reports are transmitted, multiplexed in the first resource, to the first TRP, and the second set of CSI reports are transmitted, multiplexed in the second resource, to the second TRP.

15. An apparatus of a user equipment (UE) for wireless communication, comprising:
    a first interface configured to:
        obtain an indication of a non-ideal backhaul condition between a first transmit-receive point (TRP) and a second TRP, and
        obtain at least one configuration that identifies a resource for multiplexing channel state information (CSI) reports with a potential to collide in a slot;
    a processing system configured to determine that multiple CSI reports of a first set of CSI reports that are to be transmitted to the first TRP, or of a second set of CSI reports that are to be transmitted to the second TRP, have the potential to collide in the slot; and
    a second interface configured to output at least one of the first set of CSI reports for the first TRP or the second set of CSI reports for the second TRP according to the at least one configuration,
        wherein the first set of CSI reports or the second set of CSI reports are multiplexed in the resource.

16. The apparatus of claim 15, wherein the at least one configuration identifies a plurality of resources, and wherein the processing system is further configured to select the resource for multiplexing CSI reports based on a payload size of the first set of CSI reports or the second set of CSI reports.

17. The apparatus of claim 15, wherein the processing system, when determining that multiple CSI reports have the potential to collide in the slot, is configured to determine that a first CSI report and a second CSI report are scheduled in overlapping resources in the slot.

18. The apparatus of claim 15, wherein the processing system is further configured to determine a first association between the first set of CSI reports and the first TRP and a second association between the second set of CSI reports and the second TRP.

19. The apparatus of claim 18, wherein the first association and the second association are determined based on at least one of:
   a first other configuration identifying a first resource for transmitting CSI reports as being associated with the first TRP and a second other configuration identifying a second resource for transmitting CSI reports as being associated with the second TRP; or
   another configuration that identifies a first CSI reporting configuration as being associated with the first TRP and a second CSI reporting configuration as being associated with the second TRP.

20. The apparatus of claim 15, wherein the indication of the non-ideal backhaul condition is received prior to outputting the at least one of the first set of CSI reports or the second set of CSI reports.

21. The apparatus of claim 15, wherein the non-ideal backhaul condition is indicated based on at least one of:
   another configuration that indicates the non-ideal backhaul condition;
   another configuration that identifies different hybrid automatic repeat request (HARQ) acknowledgment reports for the first TRP and the second TRP;
   a first other configuration identifying a first resource for transmitting CSI reports as being associated with the first TRP and a second other configuration identifying a second resource for transmitting CSI reports as being associated with the second TRP; or
   another configuration that identifies a first CSI reporting configuration as being associated with the first TRP and a second CSI reporting configuration as being associated with the second TRP.

22. The apparatus of claim 15, wherein the first set of CSI reports and the second set of CSI reports are outputted in separate resources.

23. The apparatus of claim 22, wherein the second set of CSI reports is a subset of non-colliding CSI reports of a set of CSI reports having a plurality of CSI reports that have the potential to collide in the slot.

24. The apparatus of claim 22, wherein the second set of CSI reports includes one or more CSI reports that are selected according to one or more prioritization criteria from a set of CSI reports having a plurality of CSI reports that have the potential to collide in the slot.

25. The apparatus of claim 22, wherein the separate resources do not overlap.

26. The apparatus of claim 22, wherein the processing system, when obtaining the at least one configuration, is configured to obtain a first configuration that identifies a first resource for multiplexing CSI reports, and obtain a second configuration that identifies a second resource for multiplexing CSI reports, and
   wherein the first set of CSI reports are outputted, multiplexed in the first resource, for the first TRP, and the second set of CSI reports are outputted, multiplexed in the second resource, for the second TRP.

27. The apparatus of claim 15, wherein the at least one configuration is a single configuration that identifies a first resource for multiplexing CSI reports that are to be transmitted to the first TRP and a second resource for multiplexing CSI reports that are to be transmitted to the second TRP, and
   wherein the first set of CSI reports are outputted, multiplexed in the first resource, for the first TRP, and the second set of CSI reports are outputted, multiplexed in the second resource, for the second TRP.

28. A non-transitory computer-readable medium storing a set of instructions for wireless communication, the set of instructions comprising:
   one or more instructions that, when executed by one or more processors of a user equipment (UE), cause the UE to:
      receive an indication of a non-ideal backhaul condition between a first transmit-receive point (TRP) and a second TRP;
      receive at least one configuration that identifies a resource for multiplexing channel state information (CSI) reports with a potential to collide in a slot;
      determine that multiple CSI reports of a first set of CSI reports that are to be transmitted to the first TRP, or of a second set of CSI reports that are to be transmitted to the second TRP, have the potential to collide in the slot; and
      transmit at least one of the first set of CSI reports to the first TRP or the second set of CSI reports to the second TRP according to the at least one configuration,
         wherein the first set of CSI reports or the second set of CSI reports are multiplexed in the resource.

29. An apparatus for wireless communication, comprising:
   means for receiving an indication of a non-ideal backhaul condition between a first transmit-receive point (TRP) and a second TRP;
   means for receiving at least one configuration that identifies a resource for multiplexing channel state information (CSI) reports with a potential to collide in a slot;
   means for determining that multiple CSI reports of a first set of CSI reports that are to be transmitted to the first TRP, or of a second set of CSI reports that are to be transmitted to the second TRP, have the potential to collide in the slot; and
   means for transmitting at least one of the first set of CSI reports to the first TRP or the second set of CSI reports to the second TRP according to the at least one configuration,
      wherein the first set of CSI reports or the second set of CSI reports are multiplexed in the resource.

30. The method of claim 1, wherein the first TRP corresponds to a first index value for a first respective control resource set (CORESET), and wherein the second TRP corresponds to a second index value for a second CORESET.

* * * * *